US007032215B2

(12) United States Patent
Harrison, III et al.

(10) Patent No.: US 7,032,215 B2
(45) Date of Patent: Apr. 18, 2006

(54) METHOD AND SYSTEM FOR TYPE DEMOTION OF EXPRESSIONS AND VARIABLES BY BITWISE CONSTANT PROPAGATION

(75) Inventors: Williams Ludwell Harrison, III, Brookline, MA (US); Cotton Seed, Brookline, MA (US)

(73) Assignee: Intel Corporation, Santa Clara, CA (US)

( * ) Notice: Subject to any disclaimer, the term of this patent is extended or adjusted under 35 U.S.C. 154(b) by 601 days.

(21) Appl. No.: 09/975,864

(22) Filed: Oct. 11, 2001

(65) Prior Publication Data

US 2003/0121029 A1    Jun. 26, 2003

(51) Int. Cl.
G06F 9/45 (2006.01)
(52) U.S. Cl. ...................................... 717/140
(58) Field of Classification Search ........... 717/106, 717/136, 151
See application file for complete search history.

(56) References Cited

U.S. PATENT DOCUMENTS

| | | | | | |
|---|---|---|---|---|---|
| 4,667,290 | A | * | 5/1987 | Goss et al. ................. | 717/147 |
| 5,742,840 | A | * | 4/1998 | Hansen et al. .............. | 712/210 |
| 6,058,465 | A | * | 5/2000 | Nguyen ..................... | 712/7 |
| 6,113,650 | A | * | 9/2000 | Sakai ........................ | 717/160 |
| 6,269,363 | B1 | * | 7/2001 | Matias ....................... | 707/5 |
| 6,772,399 | B1 | * | 8/2004 | Saluja et al. ................ | 716/2 |
| 6,807,651 | B1 | * | 10/2004 | Saluja et al. ................ | 716/2 |
| 6,848,099 | B1 | * | 1/2005 | Harrison et al. ............ | 717/154 |
| 2003/0018603 | A1 | * | 1/2003 | Tip et al. ................... | 707/1 |
| 2003/0167462 | A1 | * | 9/2003 | Harrison et al. ............ | 717/154 |
| 2003/0188299 | A1 | * | 10/2003 | Broughton et al. ......... | 717/141 |
| 2004/0015533 | A1 | * | 1/2004 | Hansen et al. .............. | 708/523 |
| 2004/0024536 | A1 | * | 2/2004 | Rognes ...................... | 702/20 |
| 2004/0073773 | A1 | * | 4/2004 | Demjanenko ............... | 712/7 |

OTHER PUBLICATIONS

Balakrishnan, S.; Nandy, S.K., "Arbitrary presision arithmetic-SIMD style", IEEE 1997, p. 128-132, retrieved from IEEE Aug. 3, 200.*

Larsen, Samuel; Amarasinghe, Saman, "Exploiting Superword Level Parallelism with Multimedia Instruction Sets", p. 1-11, Nov. 18, 1999, <URL: www.cag.lcs.mit.edu/commit/papers/99/SLP-TM.pdf> retrieved Aug. 3, 2004.*

Owen, Robert E; Martin, Daniel, "A Uniform Analysis Method for SDP Architectures and Instruction Sets with a Comprehensive Example", p. 528-537, Signal Processing Systems, 1998, retrieved from IEEE Aug. 3, 2004.*

(Continued)

Primary Examiner—Tuan Dam
Assistant Examiner—Mary J. Steelman
(74) Attorney, Agent, or Firm—Blakely, Sokoloff, Taylor & Zafman LLP

(57) ABSTRACT

A method and system for type demotion of expressions and variables by bitwise propagation is disclosed. In one embodiment, a method, comprises determining when an operation on a larger data type may be replaced by the operation on a smaller data type having a reduced precision, wherein the operation is contained in code associated with a language implementation system; and replacing the operation on the larger data type by the operation on the smaller data type.

28 Claims, 5 Drawing Sheets

OTHER PUBLICATIONS

"MMX technology developers guide: Chapter 4 MMX tm Code Development Strategy", (Intel 1997), retrieved from <URL: www.udayton.edu/~cps/cps560/notes/hardware/mmx/intel/dg_chp4.htm>, retrieved Aug. 3, 2004.*

Stephenson, Mark; Babb, Jonathan; Amarasinghe, Saman; "Bitwidth Analysis with Application to Silicon Compilation", p. 108-120, ACM 2000, retrieved from ACM Apr. 28, 2005.*

* cited by examiner

METHOD AND SYSTEM FOR TYPE DEMOTION OF EXPRESSIONS AND VARIABLES BY BITWISE CONSTANT PROPAGATION

FIELD OF THE INVENTION

This invention relates to computer software programming language implementation systems, and more specifically to a computer software programming language implementation system that performs type demotion of expressions and variables by bitwise propagation.

BACKGROUND OF THE INVENTION

A Language Implementation System ("LIS") is a computer program that could be a compiler or Computer Aided Design ("CAD") system, which receives a source program as input. The source program is written in a source language. The LIS translates the source program into an equivalent target program. The target program is written in a target language.

Many source and target languages are known. For example, source languages include Basic, Pascal, Fortran, C, and Lisp. Target languages include machine languages for computers having one or more processors.

A target machine may provide the capability of performing arithmetic operations using a variety of types. For example, some target machines provide vector arithmetic in which the vector elements are small integer types. When there is a mismatch between the types used in a source language program and the types available in operations on the target machine, a compiler can be used to discover opportunities to perform the source language math safely, using the target machine types.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

Figure 1:
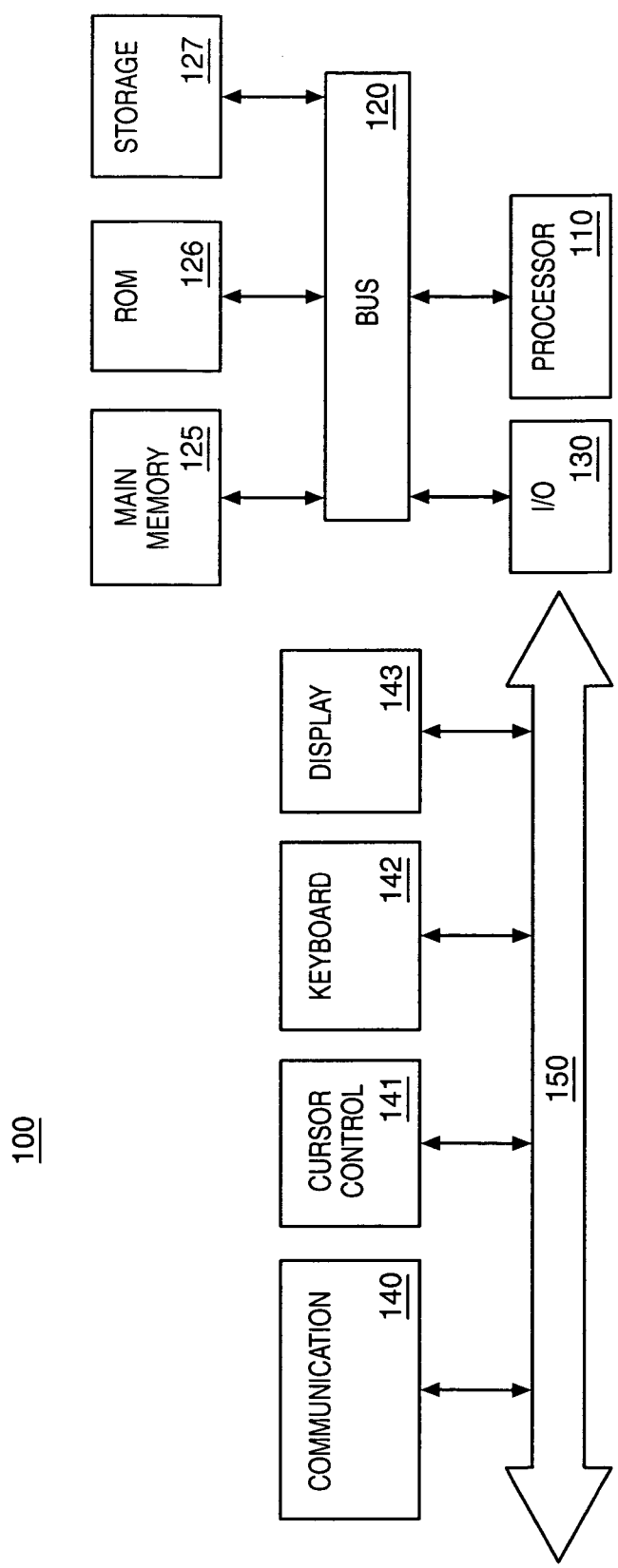
FIG. 1 illustrates a computer system representing an integrated multi-processor, in which elements of the present invention may be implemented.

A method and system for type demotion of expressions and variables by bitwise propagation is disclosed. In one embodiment, a method, comprises determining when an operation on a larger data type may be replaced by the operation on a smaller data type having a reduced precision, wherein the operation is contained in code associated with a language implementation system; and replacing the operation on the larger data type by the operation on the smaller data type. The present method expresses operations using one type in the source language that may be implemented using operations on a smaller type on the target machine. This is valuable because the smaller target machine operations are often faster and more efficient than operations on larger types.

In the following description, for purposes of explanation, specific nomenclature is set forth to provide a thorough understanding of the present invention. However, it will be apparent to one skilled in the art that these specific details are not required in order to practice the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a computer system 100 representing an integrated multi-processor, in which elements of the present invention may be implemented. One embodiment of computer system 100 comprises a system bus 120 for communicating information, and a processor 110 coupled to bus 120 for processing information. Computer system 100 further comprises a random access memory (RAM) or other dynamic storage device 125 (referred to herein as main memory), coupled to bus 120 for storing information and instructions to be executed by processor 110. Main memory 125 also may be used for storing temporary variables or other intermediate information during execution of instructions by processor 110. Computer system 100 also may include a read only memory (ROM) and/or other static storage device 126 coupled to bus 120 for storing static information and instructions used by processor 110.

A data storage device 127 such as a magnetic disk or optical disc and its corresponding drive may also be coupled to computer system 100 for storing information and instructions. Computer system 100 can also be coupled to a second I/O bus 150 via an I/O interface 130. A plurality of I/O devices may be coupled to I/O bus 150, including a display device 143, an input device (e.g., an alphanumeric input device 142 and/or a cursor control device 141). For example, video news clips and related information may be presented to the user on the display device 143.

The communication device 140 is for accessing other computers (servers or clients) via a network. The communication device 140 may comprise a modem, a network interface card, or other well-known interface device, such as those used for coupling to Ethernet, token ring, or other types of networks.

Figure 2:
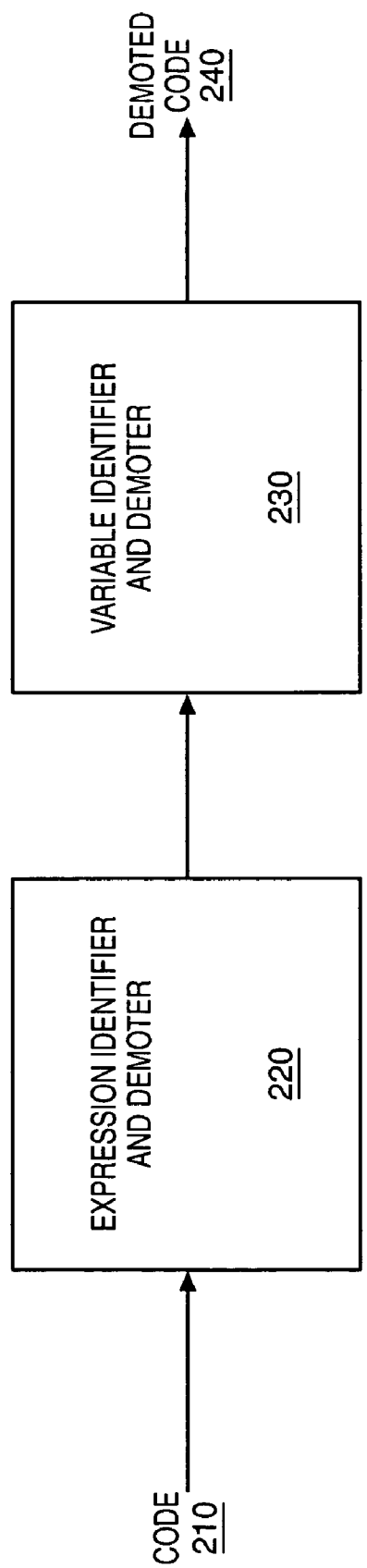
FIG. 2 illustrates a block of a structure of two demotion mechanisms according to one embodiment of the invention.

FIG. 2 illustrates a block of a structure of two demotion mechanisms according to one embodiment of the invention. A data operations identifier and demoter 220 of this embodiment inputs a source code 210, which is transformed from a high-level language to an intermediate language. The intermediate language may be the one described here, or a similar intermediary programming language.

An Example Intermediate Language

The intermediate language contains two operations for operating on the state of the computer: a GET expression for reading from memory or registers, and a PUT expression for writing to memory or registers. It is assumed that all operations on the state are performed using these operations; that is, none of the other operations in the language have implicit side-effects on the state, at least not on the state that is subject to analysis by this method. Every PUT and GET in the program is assumed to have associated with it an alias, such that if two GETs or PUTs have different aliases, then there is no execution of the program under which those GETs and PUTs access the same storage location (memory address or register). Aliases are therefore an equivalence relation on the GETs and PUTs of the program such that all potentially dependent GETs and PUTs are assigned the same alias. In the case of a compiler temporary variable, virtual register, or other storage location that is accessed simply and transparently by the program, the GETs and PUTs that access that temporary variable or virtual register will have the same alias, and no other PUTs and GETs in the program will have the same alias. Any alias analysis method that partitions the memory accesses of the program into equivalence classes according to potential dependence is adequate for the purpose of computing a correct set of aliases from the program; of course a sharper alias analysis method will yield a more precise result from the bitwise constant propagation method.

The representation of control flow in the intermediate language is irrelevant to the method, as the method is flow-insensitive.

For purposes of exposition, it is assumed that the statements of the intermediate language have the following syntax:

```
S: (PUT A E)
E: (INTEGER [T] Z)
   | (BITAND E E)
   | (BITOR E E)
   | (BITNOT E)
   | (LEFT E E)
   | (SRIGHT E E)
   | (URIGHT E E)
   | (OP E E)
   | (GET [T] A)
A: alias
Z: integer
T: integer (number of bits)
```

The expressions of this language are typed by their size in bits. A type is written as [T], where T is the number of bits. For example, [10] denotes a 10-bit type. The atomic forms—INTEGER and GET—include a type specifier, whereas the remaining, compound forms have an implicit type which can be deduced from the types of their subexpressions.

(PUT A E): This is the (abstract) form of a statement that writes to a storage location (memory or register). The expression E gives the value, which is written to the location. A is an alias. The aliases must have the property that, given two GET or PUT expressions X1 and X2 whose aliases are different, there must be no execution of the program such that X1 and X2 access the same storage location.

In reality, an assignment to memory must include an expression for the address that is written, and an assignment to a register must include a specification of the register that is written; these are absent from the PUT expression, which has only an expression E for the value, which is written to the memory location or register. This is because the information required by the method concerning the storage location affected by the PUT is summarized in the alias A associated with the PUT. A PUT expression yields no value; it is as though its type were [0].

(INTEGER [T] Z): This is the expression for an integer constant of T bits. Z is an integer that gives the value of the constant. For example, (integer [10] 17) is a 10-bit integer whose value is 17, or 0000010001 in binary code.

(BITAND E E): This expression returns the bitwise AND of its two arguments. The types of the two arguments must be equal and the type of the result is that of the arguments.

(BITOR E E): This expression returns the bitwise OR of its arguments.

(BITNOT E): This expression returns the bitwise complement of its argument. The type of the result is the type of the argument.

(LEFT E): This expression returns the result of shifting its argument left by 1 bit. The vacated bit position is zero-filled.

(SRIGHT E): This expression returns the result of shifting its argument right by the 1 bit. The vacated bit position is filled with a copy of the most significant bit of the argument.

(URIGHT E E): This expression returns the result of shifting its argument right by the 1 bit. The vacated bit position is zero-filled.

(GET [T] A): This is the (abstract) form of an operation that reads from the state of the computer.

Various binary and unary operators are replaced by a single binary operator, OP, and four conversion operators have been added: SIGNEXTEND, ZEROEXTEND, EXTEND, and TRUNCATE. The expression (SIGNEXTEND [t] E) sign-extends the value of E to t bits. By sign-extends it is meant that the upper bits of the result are filled with copies of the most significant bit (sign bit) of the argument. (ZEROEXTEND [t] E) is similar, but the upper bits of the result are filled with zero bits. EXTEND is similar to ZEROEXTEND and SIGNEXTEND, but the upper bits of its result are undefined. EXTEND can be correctly implemented using either ZEROEXTEND or SIGNEXTEND, but both of these operators produce a better defined result than is required of EXTEND. The operator TRUNCATE discards upper bits of its argument. The expression (TRUNCATE [t] E) returns the least significant t-s bits of the value of E, where [s] is the type of E.

The utility function Leftmost1 is used to map an integer to an integer. The value of Leftmost1(x) is zero if x is zero, and the position of the most significant 1 bit in x, if x is non-zero. Bit positions are counted from 1 (least significant bit). For example, Leftmost1(0110)=3.

It is to be understood that FIG. 2 shows characteristic features only of this embodiment and omits other general configurations. Given source code 210 in an intermediate language, expression identifier and demoter 220 determines when operations on larger data types may be replaced by operations on smaller data types. Expression identifier and demoter 220 then replaces the expressions (i.e., data operations) according to the process described below, to generate programming code with demoted operations. This code is passed on to variable identifier and demoter 230.

The variable identifier and demoter 230 determines when variables of larger types can be replaced by variables of smaller types. Variable identifier and demoter 230 then replaces the appropriate variables to generate demoted code 240.

Demoted code 240 may be provided to an automatic vectorizer for a signal processing or media processing instruction set. For example, many signal and media processors, as well as general-purpose processors with signal- and media-processing extensions, provide operations on vectors whose elements are of a small, fixed point data type. In such a typical instruction set a vector might consist of 8 16-bit elements packed into a single 128 bit word. In order to automatically make use of such an instruction set via a compiler, it is desirable to convert operations on larger data types (typically 32 or 64 bits) into operations on the vector element type. This is made necessary by the fact that programming languages typically specify that arithmetic operations are carried out, by default, in a larger type than the vector element type provided by the signal or media processor.

Thus, the present method and system performs a function that is central to automatic vectorization for signal and media processors that provide vector operations on small fixed-point data types, like MultiMedia Extensions ("MMX"), Single Instruction Multiple Data ("SIMD") Stream Extensions ("SSE"), MSA, or the signal processing extensions to XScale. The present method provides a deep and theoretically sound solution to the problem about which certain optimality results may be proven. The present method and system applies to a large class of programs and operations on fixed-point types: any operation whose semantics can be analyzed using the bitwise constant propagation algorithm (described below) may be treated by the methods described herein.

The processes performed by demoters 220 and 230 are described below in connection with FIGS. 3 and 4. The initial conditions of the processes are as follows. The program under consideration may have every OP expression in a statement of the form:

(PUT a (OP (GET [t] b) (GET [t] c)))

where a, b, and c are Single Static Assignment ("SSA") variables.

It is said that a variable v is an SSA variable if there is exactly one PUT to v in the program and if this PUT dominates all GETs of the v (i.e., every GET of v is in a statement that is dominated by and distinct from the single PUT of v). This definition partitions the variables of the program into two classes, the SSA variables and the non-SSA variables. It is assumed that for every SSA variable v, RHS(v) gives the right-hand side of the assignment to v. In other words, if the assignment to v is (PUT v E) then RHS(v)=E. If v is an SSA variable, an expression of the form (GET v) is referred to as an SSA GET, and an expression of the form (PUT v X) as an SSA PUT; and similarly, GETs and PUTs of a non-SSA variable will be called non-SSA GETs and PUTs.

It is assumed moreover that a Bitwise Constant Propagation method as specified below may have been performed, so that for every alias a in the program, ForwardValue[a] and BackwardValue[a] exist.

It is assumed that given a vector element type [s]; it is desired to demote expressions and variables from larger types [t] to [s] where possible. With these initial conditions the demoters 220 and 230 of FIG. 2 may perform the processes described herein.

Process Demote Expression

Figure 3:
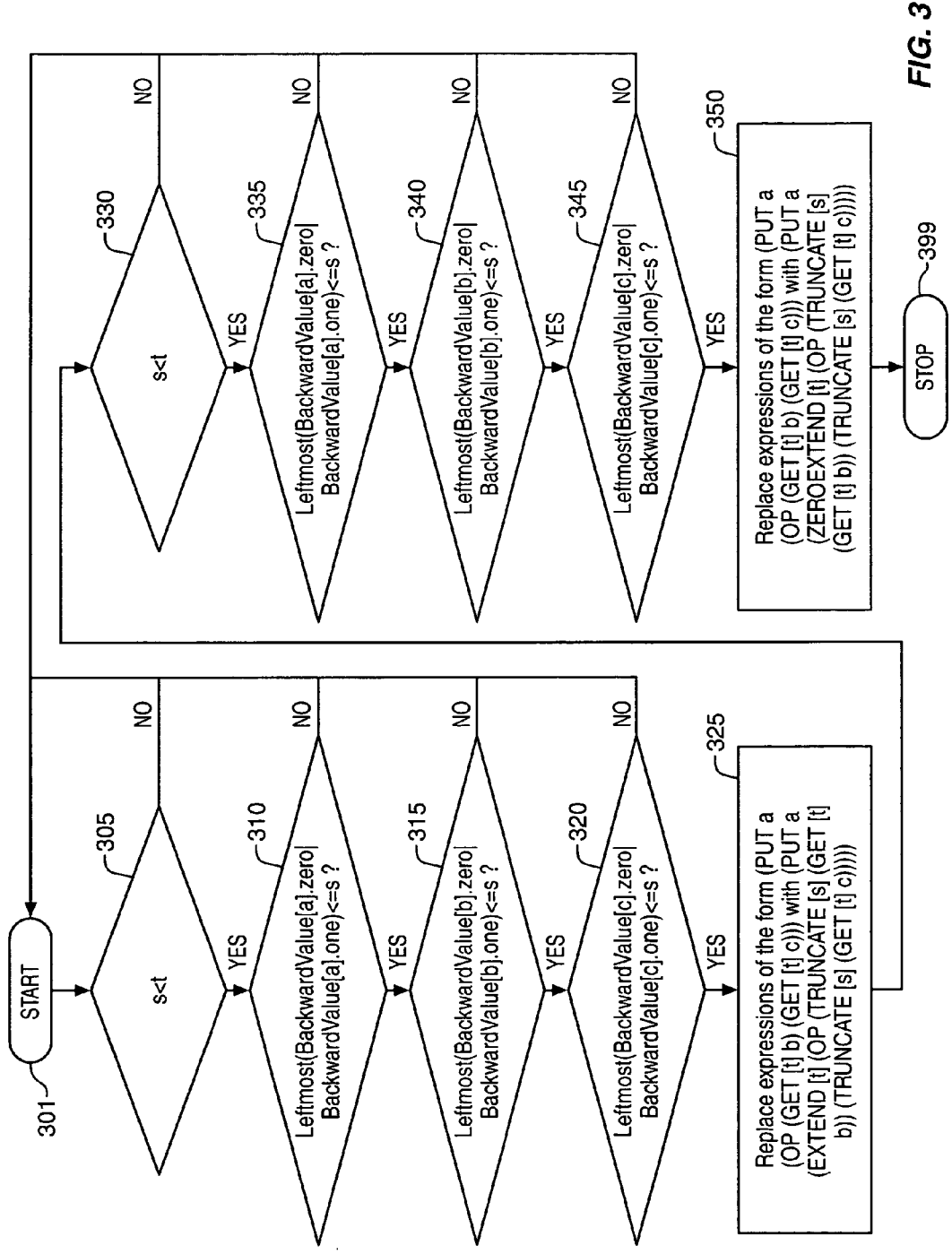
FIG. 3 illustrates a flow diagram of the process demote expression 300 performed by Expression Identifier and Demoter 220 according to one embodiment of the present invention.

FIG. 3 illustrates a flow diagram of the process demote expression 300 performed by Expression Identifier and Demoter 220 according to one embodiment of the present invention. The process begins at block 301. Decision block 305 determines if vector element s is less than t. If s is not less than t, then flow returns to start block 301. If s is less than t, then flow continues to decision block 310. At decision block 310, if Leftmost1(BackwardValue[a].zero|BackwardValue[a].one) <=s, then flow continues to decision block 315. If Leftmost1(BackwardValue[a].zero|BackwardValue[a].one)>s then flow returns to start block 301.

At decision block 315, if Leftmost1(BackwardValue[b].zero|BackwardValue[b].one)<=s, then flow continues to decision block 320. If Leftmost1(BackwardValue[b].zero|BackwardValue[b].one)>s, then flow continues to decision block 320. If Leftmost1(BackwardValue[c].zero|BackwardValue[c].one)<=s, then flow continues to processing block 325. If Leftmost1(BackwardValue[c].zero|BackwardValue[c].one)>s, then flow returns to start block 301.

Processing block 325, replaces each expression of the form:

(PUT a (OP (GET [t] b)(GET [t] c)))

by the expression:

(PUT a (EXTEND [t] (OP (TRUNCATE [s] (GET [t] b))(TRUNCATE [s] (GET [t] c))))).

Flow continues to decision block 330.

Decision block 330 determines if vector element s is less than t. If s is not less than t, then flow returns to start block 301. If s is less than t, then flow continues to decision block 335. At decision block 335, if Leftmost1(BackwardValue[a].one)<=s, then flow continues to decision block 340. If Leftmost1(BackwardValue[a].one)>s, then flow returns to start block 301. At decision block 340, if Leftmost1(BackwardValue[b].zero|BackwardValue[b].one)<=s, then flow continues to decision block 345. If Leftmost1(BackwardValue[b].zero|BackwardValue[b].one)>s, then flow returns to start block 301. At decision block 345, if Leftmost1 (BackwardValue[c].zero|BackwardValue[c].one)<=s, then flow continues to processing block 350. If Leftmost1(BackwardValue[c].zero|BackwardValue[c].one)>s, then flow returns to start block 301.

Processing block 350, replaces each expression of the form
(PUT a (OP (GET [t] b) (GET [t] c)))
by the expression
(PUT a (ZEROEXTEND [t] (OP (TRUNCATE [s] (GET [t] b))
(TRUNCATE [s] (GET [t] c)))))

The process ends at stop block 399. This process has the effect of replacing an OP that operates on t bits by an OP that operates on s bits. Note that the procedure is independent of OP; it depends only on the backward values of OP's inputs and output.

Procedure Demote Variable

Figure 4:
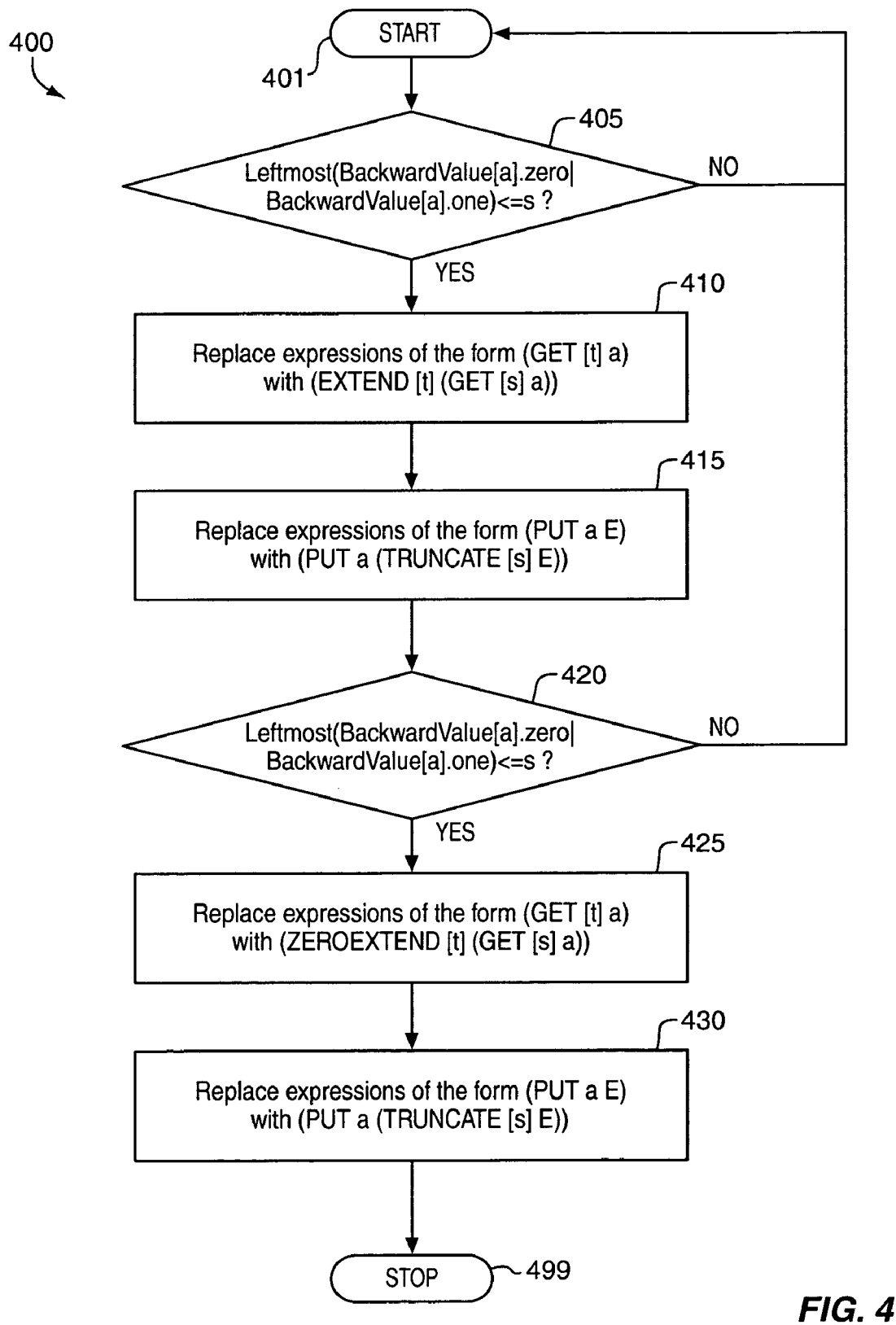
FIG. 4 illustrates a flow diagram of the process demote expression 300 performed by Variable Identifier and Demoter 230 according to one embodiment of the present invention.

FIG. 4 illustrates a flow diagram of the process demote variable 400 performed by Variable Identifier and Demoter 230 according to one embodiment of the present invention. The process begins at block 401. Decision block 405 determines if Leftmost1(BackwardValue[a].zero|BackwardValue [a].one)<=s, then flow continues to processing block 410. If Leftmost1(BackwardValue[a].zero|BackwardValue[a].one) >s, then flow returns to start block 401. Processing block 410 replaces every expression of the form
(GET [t] a)
by the expression
(EXTEND [t] (GET [s] a)).

Flow continues to processing block 415, where every expression of the form:
(PUT a E)
by the expression
(PUT a (TRUNCATE [s] E)). Flow continues to decision block 420.

At decision block 420, if Leftmost1(BackwardValue[a].one)<=s, then flow continues to processing block 425. If Leftmost1(BackwardValue[a].one)>s, then flow returns to start block 401. Processing block 425 replaces every expression of the form
(GET [t] a)
by the expression
(ZEROEXTEND [t] (GET [s] a)).

Flow continues to processing block 430, where every expression of the form
(PUT a E)
is replaced by the expression
(PUT a (TRUNCATE [s] E)).

The process ends at stop block 499. This procedure reduces the precision of a variable from t bits to s bits.

When the process demotion of expressions 300 is applied in conjunction with the process demotion of variables 400, the resulting program will have opportunities for algebraic simplification. For example, the expression
(PUT a (ADD (GET [t] b) (GET [t] c)))
will be transformed to

```
(PUT a
  (TRUNCATE [s]
    (ZEROEXTEND [t]
      (ADD
        (TRUNCATE [s]
          (ZEROEXTEND [t]
            (GET [s] b))
        (TRUNCATE [s]
          (ZEROEXTEND [t]
            (GET [s] c))))))))
``` if a, b, and c can all be demoted to s bits. By application of the rule that
(TRUNCATE [s] (ZEROEXTEND [t] E))=E when E has type [s]
this can be simplified to
(PUT a (ADD (GET [s] b) (GET [s] c))).

In general it is desirable to apply a sophisticated algebraic rewriter to the program that is produced by the demoting transformations given above, as there will be many opportunities for simplification, some local in scope and others global. The present method and system may be implemented with a method for optimizing an implementation of a programming language as described below.

A Method for Optimizing an Implementation of a Programming Language

Figure 5:
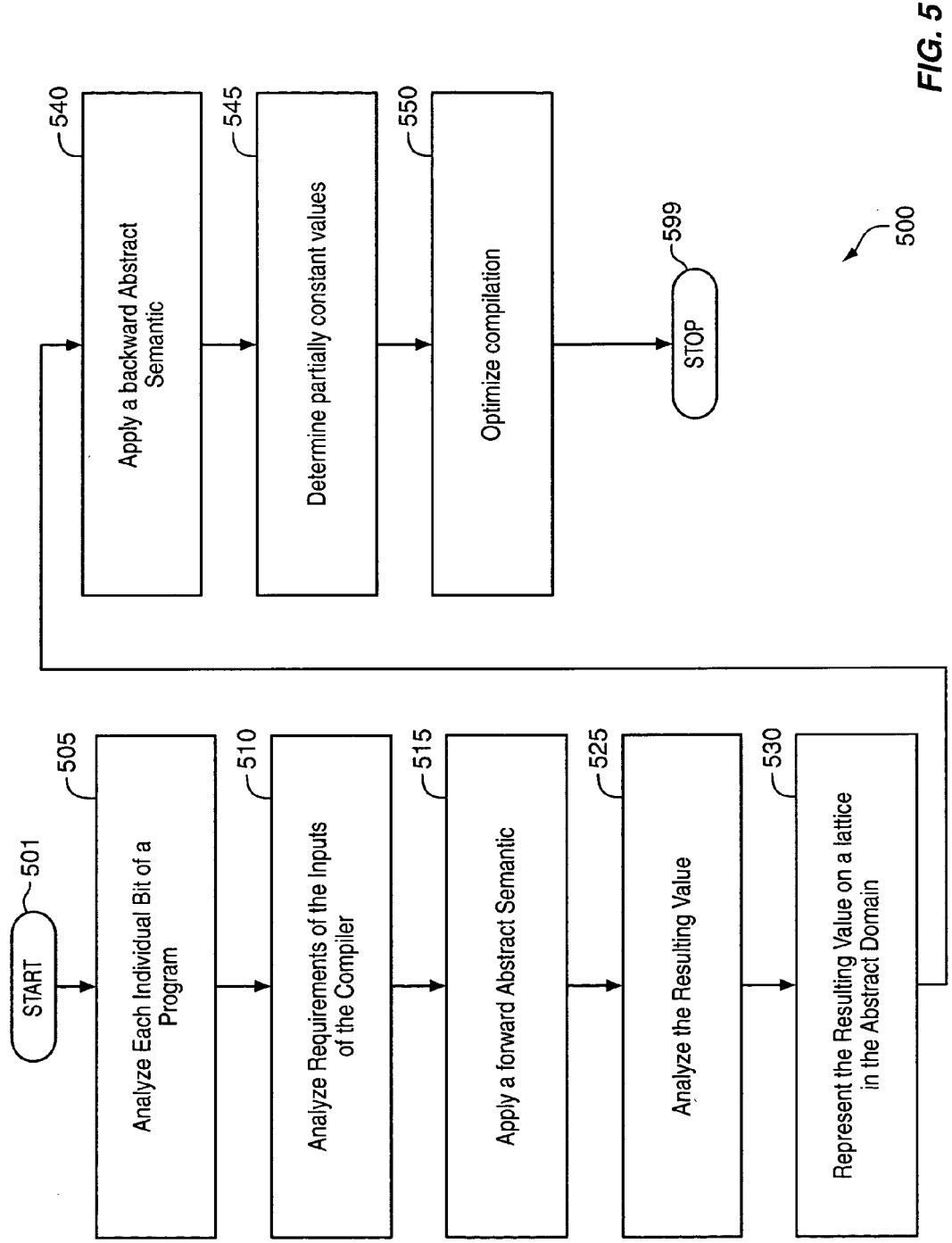
FIG. 5 illustrates a flow diagram of a method 500 for optimizing an implementation of a programming language.

According to one embodiment, FIG. 5 illustrates a flow diagram of a method 500 for optimizing an implementation of a programming language. The implementation of a programming language that is optimized may be an assembly language compiler, C compiler, C++ compiler, Computer Aided Design compiler or similar compilation mechanism. With compilers such as these, one or more values are generally computed by a program written in the programming language. The process begins at start block 501. At processing block 505, each bit of the program is analyzed separately including representing each bit within a value of the one or more values as an abstract element of a lattice having a set of abstract elements including $0_A$, $1_A$, $\perp_A$ and $T_A$. The lattice is an abstraction of a concrete domain containing 0, 1, and $\perp$. In one embodiment, the analysis of each bit occurs concurrently or in parallel, wherein another embodiment, a batch analysis of bits is performed, but still on a bit-by-bit basis. Flow continues to processing block 510 where the process analyzes the requirements of the inputs of the compiler including analyzing the input bits that are input to an operation in terms of the output bits that are produced by the operation. For example, the inputs may be defined (either 0 or 1) or the inputs may be undefined ($\perp$). In addition, in the concrete domain, the operation performed on the inputs may be boolean functions such as AND, OR, and NOT, or complex boolean functions.

At processing block 515, a forward abstract semantic is applied to the inputs. The forward abstract semantic is associated with the forward concrete semantic (boolean operation), to provide an abstract result from the concrete inputs. The abstract result is an approximation of a more exact meaning that is generally computed by a compiler. For example, if the exact meaning is a floating point number, the result could be the exact meaning rounded up to the nearest integer. Flow continues to processing block 525 where the resulting value is analyzed for each forward abstract semantic performed on the inputs, including analyzing one or more output bits that are produced by an operation in terms of one or more input bits that are input to the operation. Knowing what forward abstract semantic was applied to the inputs, the method determines if an alternate set of inputs may be used to generate the same exact result value. Thus, alternate input values are generated.

In processing block 530, the resulting abstract value is represented on an abstract lattice having the elements $0_A$, $1_A$, $\perp_A$ and $T_A$. The abstract lattice is an abstraction of a concrete domain having the elements 0, 1, and $\perp$. A backward abstract semantic is applied at processing block 540. The backward semantic is an approximation of a backward concrete semantic including $AND^{-1}$, $OR^{-1}$, and $NOT^{-1}$ (or other complex boolean backward semantics). The result of the abstract backward semantic is a set of inputs that may be different than the original inputs, but that will provide the same result.

Flow continues to processing block 545 where the inputs are analyzed to determine if they are partially constant values (as described above). At processing block 550, the compilation is optimized. For example, inputs that do not contribute to the result can be discarded. The process ends at block 599.

In an alternate embodiment, the method proceeds in two phases. In the first phase, a bipartite graph G is built over the aliases and PUT statements of the program. This graph expresses the flow of values between statements of the program. G is a kind of dependence flow graph. This graph can be either intraprocedural or interprocedural in scope, and the method operates intraprocedurally or interprocedurally accordingly.

In the second phase, the method maintains a set of nodes of G, which are ready for processing. It then repeatedly removes and processes nodes from this set until the set is empty. If a processed node is a PUT statement, it evaluates the statement (by symbolically executing it), updates the abstract value associated with an alias of the PUT, and adds the alias to the working set if the updated value for the alias has changed. If the processed node is an alias, the method simply adds its successors in G to the set for evaluation.

Bitwise Constant Propagation Method

Let S be the number of PUT statements in the program. Let A be the number of aliases associated with the GETs and PUTs of the program. Let N=S+A. Let G be a graph on N nodes (with no edges initially), and let there be a one-to-one correspondence between the nodes of G and the PUT statements and aliases of the program. Let Q be a set of nodes of G, initially empty.

```
AbstractValue ForwardValue [ A ];
AbstractValue BackwardValue [ A ];
Phase 1
    For each alias M:
        add an edge to G from the node corresponding to each PUT
        statement whose alias is M to the node corresponding to M
        add an edge to G from the node corresponding to M to the node
        corresponding to each PUT statement that contains a GET whose
        alias is M
```

-continued

```
Phase 2
    For each alias M:
        Forward Value[M] = InitialForwardValue(M)
        Add the node corresponding to M to Q.
    While Q is nonempty, do:
        Let n be an element of Q. Remove n from Q.
        If n corresponds to an alias, add the successors of n in G to Q.
        If n corresponds to a statement of the form (PUT A E1), do:
            let V = Eval_forward(E1)
            if not(LE(V, ForwardValue[A])) then
                ForwardValue[A] = JOIN(ForwardValue[A], V)
                Add A to Q
Phase 3
    For each alias M:
        BackwardValue[M] = InitialBackwardValue(M)
        Add the nodes corresponding to M to Q.
    While Q is nonempty, do:
        Let n be an element of Q. Remove n from Q.
        If n corresponds to an alias, add the predecessors of n in G
        to Q.
        If n corresponds to a statement of the form (PUT A E1), do:
            let V = Backward Value[A]
            Eval_backward(E1, V)
end Bitwise Constant Propagation Method
```

The ForwardValue for each alias M is set to InitialForwardValue(M) at the outset of phase 2. The InitialForwardValue for an alias must reflect the initial state of memory for that alias and/or assignments to the alias that occur outside of and prior to the program text under analysis. For example, if the alias represents a memory location(s) that may be initialized statically, the InitialForwardValue for that alias must be high enough to represent the value of the static initializers. Similarly, the BackwardValue for each alias M is set to InitialBackwardValue(M) at the outset of phase 3. InitialBackwardValue for an alias must reflect any final uses for the alias, i.e., references that occur outside of and following the program text under analysis. For example, if an alias represents a global variable that may be read after execution of the program fragment being analyzed, then InitialBackwardValue for that alias must be high enough to represent the demand imposed by the use.

```
AbstractValue Eval_forward (Expression E)
{
    case E of
    (BITAND E1 E2):
        return BitAnd(Eval_forward(E1), Eval_forward(E2))
    (BITOR E1 E2):
        return BitOr(Eval_forward(E1), Eval_forward(E2))
    (BITNOT E1):
        return BitNot(Eval_forward(E1))
    (LEFT E1 E2):
        return Left(Eval_forward(E1), Eval_forward(E2))
    (SRIGHT E1 E2):
        return SRight(Eval_forward(E1), Eval_forward(E2))
    (URIGHT E1 E2):
        return URight(Eval_forward(E1), Eval_forward(E2))
    (GET [T] A):
        return ForwardValue[A]
}
void Eval_backward (Expression E, AbstractValue F)
{
AbstractValue V1, V2
case E of
(BITAND E1 E2):
    V1 = Eval_Forward(E1)
    V2 = Eval_Forward(E2)
    BitAnd_inv(F, V1, V2)
    Eval_Backward(E1, V1)
    Eval_Backward(E2, V2)
```

```
-continued (BITOR E1 E2):
    V1 = Eval_Forward(E1)
    V2 = Eval_Forward(E2)
    BitOr_inv(F, V1, V2)
    Eval_Backward(E1, V1)
    Eval_Backward(E2, V2)
(BITNOT E1):
    V1 = Eval_Forward(E1)
    BitNot_inv(F, V1)
    Eval_Backward(E1, V1)
    (LEFT E1 E2):
        V1 = Eval_Forward(E1)
        Left_inv(F, V1)
        Eval_Backward(E1, V1)
    (SRIGHT E1 E2):
        V1 = Eval_Forward(E1)
        SRight_inv(F, V1)
        Eval_Backward(E1, V1)
    (URIGHT E1 E2):
        V1 = Eval_Forward(E1)
        URight_inv(F, V1)
        Eval_Backward(E1, V1)
    (GET [T] A):
        if not(LE(F, BackwardValue[A])) then
            Backward Value[A] = JOIN(BackwardValue[A], F)
            Add A to Q
    }
```

Note that the size of G (nodes+edges) is linear in the program text size. This follows from the fact that number of aliases in the program is less than the combined number of GETs and PUTs in the program, and hence the number of nodes in the graph is fewer than the number of GETs plus twice the number of PUTs in the program. The number of edges in G is no greater than the number of GETs plus the number of PUTs in the program.

A method and system for type demotion of expressions and variables by bitwise propagation is disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

We claim:

1. A method, comprising:
    analyzing code using bitwise constant propagation by a language implementation system to determine a backward value for each alias in the code that reflects any reference to the alias occurring outside of and following the code under analysis;
    determining whether an operation therein on a larger data type may be replaced with an operation on a smaller data type having a reduced precision, wherein the determining is based on the backward values of each alias in the analyzed code; and
    replacing the operation on the larger data type with the operation on the smaller data type if so determined.

2. The method of claim 1, further comprising:
    determining, based on the backward values of each alias in the analyzed code, whether a first variable of the larger data type may be replaced with a second variable of the smaller data type having the reduced precision; and
    replacing the first variable of the larger data type with the second variable of the smaller data type if so determined.

3. The method of claim 2, wherein replacing the operation and replacing the first variable are used for automatic vectorization for signal and media processors that provide vector operations on small fixed-point data types.

4. The method of claim 3, wherein the processors are equipped to provide MMX instructions.

5. The method of claim 3, wherein the processors are equipped to provide SSE instructions.

6. The method of claim 3, further comprising performing algebraic simplification of the code.

7. The method of claim 6, wherein the language implementation system performs the bitwise constant propagation by abstract interpretation of the code.

8. A computer-readable medium having stored thereon a plurality of instructions, said plurality of instructions when executed by a computer, cause said computer to perform:
    analyzing code using bitwise constant propagation by a language implementation system to determine a backward value for each alias in the code that reflects any reference to the alias occurring outside of and following the code under analysis;
    determining whether an operation therein on a larger data type may be replaced with an operation on a smaller data type having a reduced precision, wherein the determining is based on the backward values of each alias in the analyzed code; and
    replacing the operation on the larger data type with the operation on the smaller data type if so determined.

9. The computer-readable medium of claim 8 having stored thereon additional instructions, said additional instructions when executed by a computer for optimizing, cause said computer to further perform:
    determining, based on the backward values of each alias in the analyzed code, whether a first variable of the larger data type may be replaced with a second variable of the smaller data type having the reduced precision; and
    replacing the first variable of the larger data type with the second variable of the smaller data type if so determined.

10. The computer-readable medium of claim 9 wherein replacing the operation and replacing the first variable are used for automatic vectorization for signal and media processors that provide vector operations on small fixed-point data types.

11. The computer-readable medium of claim 10, wherein the processors are equipped to provide MMX instructions.

12. The computer-readable medium of claim 10, wherein the processors are equipped to provide SSE instructions.

13. The computer-readable medium of claim 10, having stored thereon additional instructions, said additional instructions when executed by a computer for optimizing, cause said computer to further perform performing algebraic simplification of the code.

14. The computer-readable medium of claim 13, wherein the language implementation system performs the bitwise constant propagation by abstract interpretation of the code.

15. A system, comprising:
    a processor;
    memory connected to the processor to store instructions for type demotion of expressions and variables by bitwise constant propagation, the instructions to be executed by the processor;
    storage connected to the processor to store a software code having a plurality of separately compilable routines;

wherein the processor to execute the instructions on the code to:
  analyze code using bitwise constant propagation by a language implementation system to determine a backward value for each alias in the code that reflects any reference to the alias occurring outside of and following the code under analysis;
  determine whether an operation on a larger data type may be replaced with an operation therein on a smaller data type having a reduced precision, wherein the determining is based on the backward values of each alias in the analyzed code; and
  replace the operation on the larger data type with the operation on the smaller data type if so determined.

16. The system of claim 15, wherein the processor further to:
  determine, based on the backward values of each alias in the analyzed code, whether a first variable of the larger data type may be replaced with a second variable of the smaller data type having the reduced precision; and
  to replace the first variable of the larger data type with the second variable of the smaller data type if so determined.

17. The system of claim 16, wherein the processor replaces the operation and replaces the first variable to provide vector operations on small fixed-point data types.

18. The system of claim 17, wherein the processor is equipped to provide MMX instructions.

19. The system of claim 18, wherein the processor performs algebraic simplification of the code.

20. The system of claim 17, wherein the processor is equipped to provide SSE instructions.

21. The system of claim 20, wherein the language implementation system performs the bitwise constant propagation by abstract interpretation of the code.

22. A system, comprising:
  means for analyzing code using bitwise constant propagation by a language implementation system to determine a backward value for each alias in the code that reflects any reference to the alias occurring outside of and following the code under analysis;
  means for determining whether an operation therein on a larger data type may be replaced with an operation on a smaller data type having a reduced precision, wherein the determining is based on the backward values of each alias in the analyzed code; and
  means for replacing the operation on the larger data type with the operation on the smaller data type if so determined.

23. The system of claim 22, further comprising:
  means for determining, based on the backward values of each alias in the analyzed code, whether a first variable of the larger data type may be replaced with a second variable of the smaller data type having the reduced precision; and
  means for replacing the first variable of the larger data type with the second variable of the smaller data type if so determined.

24. The system of claim 23, wherein the means for replacing the operation and the means for replacing the first variable are used for automatic vectorization for signal and media processors that provide vector operations on small fixed-point data types.

25. The system of claim 24, wherein the processors are equipped to provide MMX instructions.

26. The system of claim 24, wherein the processors are equipped to provide SSE instructions.

27. The system of claim 24, further comprising means for performing algebraic simplification of the code.

28. The system of claim 27, wherein the language implementation system performs the bitwise constant propagation by abstract interpretation of the code.

* * * * *